ically, in the diaphragm cells commonly used. The chlorine is removed from the brine by vacuum or by blowing with air, and the brine then stripped free of chlorate by reaction with HCl. The dechlorinated brine is usually saturated with KCl or NaCl before being returned to the electrolysis cells.
United States Patent [19]
Pettelkau et al.

[11] 4,155,891
[45] May 22, 1979

[54] PROCESS FOR THE PRODUCTION OF A POLYCHLOROPRENE LATEX WHICH IS STABLE TO FREEZING AND THAWING

[75] Inventors: Hans-Jürgen Pettelkau, Berlin; Rudolf Hombach, Cologne; Heinz Esser, Burscheid; Wilfried Keller, Dormagen, all of Fed. Rep. of Germany

[73] Assignee: Bayer Aktiengesellschaft, Fed. Rep. of Germany

[21] Appl. No.: 760,386

[22] Filed: Jan. 18, 1977

[30] Foreign Application Priority Data

Jan. 22, 1976 [DE]  Fed. Rep. of Germany ....... 2602353

[51] Int. Cl.² ............................................. C08L 11/02
[52] U.S. Cl. .......................... 260/23.7 A; 260/23.7 H; 260/27 BB; 260/29.7 N
[58] Field of Search ............... 260/23.7 A, 23.7 H, 260/27 BB, 29.7 N

[56] References Cited

U.S. PATENT DOCUMENTS

| | | |
|---|---|---|
| 2,138,226 | 11/1938 | Dales et al. ..................... 260/29.7 N |
| 2,218,362 | 10/1940 | Starkweather et al. ........ 260/29.7 N |
| 2,263,322 | 11/1941 | Walker et al. .................. 260/29.7 N |
| 3,872,043 | 3/1975 | Branlard et al. ............... 260/23.7 H |
| 3,878,154 | 4/1975 | Keown ............................ 260/29.7 N |
| 3,890,261 | 6/1975 | Fitzgerald ....................... 260/23.7 H |
| 3,899,459 | 8/1975 | Branlard et al. ............... 260/23.7 H |
| 3,926,880 | 12/1975 | Esser et al. ..................... 260/27 BB |
| 4,007,145 | 2/1977 | Edmondson .................... 260/29.7 H |

FOREIGN PATENT DOCUMENTS

531195  12/1940  United Kingdom ............. 260/29.7 N

*Primary Examiner*—M. J. Welsh
*Attorney, Agent, or Firm*—Connolly and Hutz

[57] ABSTRACT

Polychloroprene latex which is stable to freezing and thawing can be obtained by adding a betaine of a formula given below before, during or after polymerization.

6 Claims, No Drawings

PROCESS FOR THE PRODUCTION OF A POLYCHLOROPRENE LATEX WHICH IS STABLE TO FREEZING AND THAWING

This invention relates to a process for the production of a polychloroprene latex which is stable under conditions of freezing and thawing owing to the presence of an amphoteric compound.

Polychloroprene latices are particularly suitable for use as starting materials for the preparation of adhesive mixtures. The preparation and use of such mixtures has been described, for example, in the book "Neoprene Latex" by John C. Carl, E. I. Du Pont de Nemours & Co. (Inc.), Wilmington, Delaware, and in the Journal "Gummi, Asbest, Kunststoffe 1973", No. 5-7, pages 394-398, 494-503 and 574-582.

For certain fields of application, for example in the building industry and the "do-it-yourself" trade, adhesives based on polychloroprene latices are required not only to have excellent bonding properties but also to remain stable under conditions of freezing and thawing. This means that the adhesive based on an aqueous polychloroprene dispersion should be frost resistant and able to withstand repeated freezing (e.g. to $-30°$ C.) and thawing without damage.

Polychloroprene latices which do not contain special stabilizers normally become highly viscous when cooled to below $10°$ C. and become pasty at temperatures near the freezing point.

The preparation of polychloroprene latices which are stable under conditions of freezing and thawing has already been described in "Neoprene Latex", on pages 11 and 12 and on pages 111 et seq.

The mixture of freeze-and-thaw resistant adhesive latices described there contain up to 20% by weight of methanol.

When such adhesives are dried, the solvent methanol mainly escapes into the surrounding atmosphere. This may be harmful for toxicological and factory health reasons; the maximum work place concentration of methanol, for example, is 200 ppm*.

Oxyethylated compounds have also been recommended in the literature for the preparation of latices which are stable to freezing and thawing (Houben-Weyl, "Methoden der organischen Chemie", 4th Edition, Volume XIV/1; "Makromolekulare Stoffe" part 1, publishers Georg Thieme Verlag, Stuttgart 1961, 474 et seq; F. Holscher "Dispersionen synthetischer Hochpolymerer" part I, Springer Verlag, Berlin, Heidelberg—New York 1969, pp 34, 64, 65).

In order to render polychloroprene latices cold resistant by means of these non-ionogenic compounds, e.g. an alkyl phenol containing at least 10 ethylene oxide units, it is necessary to employ a high concentration of such compounds. This has a deleterious effect on the adhesive properties.

Polychloroprene latices which are stable to freezing and thawing and can be cooled to $-30°$ C. and then thawed to $20°$ C. at least 3 times without damage and which have good

*Maximum work-place concentration of medically harmful industrial materials (MAK values) 1974. Report X by the Commission for the Investigation of Medically Harmful Industrial Materials of the German Research Community; Deutsche Forschungsgemeinschaft, 53 Bonn-Bad Godesgerg 1, Kennedyallee 40.

adhesive properties can surprisingly be obtained by using a compound of the formula:

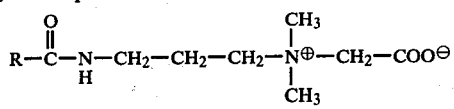

in which R denotes an alkyl group having from 7 to 18 C-atoms.

The present invention thus provides a process for the preparation of a polychloroprene latex which is stable to freezing and thawing by radical polymerisation of chloroprene which may contain up to 30% by weight of a comonomer which can be copolymerised with chloroprene, in an aqueous alkaline emulsion containing from 90 to 180 parts by weight of water per 100 parts by weight of monomer, in the presence of alkali metal salts of disproportionated abietic acids and/or alkali metal salts of fatty acids having from 6 to 25 C-atoms, and in the presence of non-ionogenic emulsifiers, characterised in that betains of the formula:

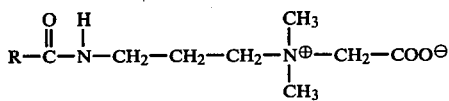

wherein R denotes a saturated or unsaturated, straight chained or branched alkyl group having from 7 to 18 C-atoms are used in quantities of from 3 to 10 parts by weight, preferably from 4 to 8 parts by weight, based on 100 parts by weight of polymer.

The following are examples of suitable saturated and unsaturated alkyl groups: caprylic, capric, myristic, palmitic and stearic groups formed by removal of the organic acid group COOH from the corresponding acids; paraffins prepared by the Fischer-Tropsch process, $\Delta^9$-dodecylene, palmitoleic, oleic, linoleic and linolenic groups derived from the corresponding acids.

The betaines mentioned above are known in the literature (Ullmann, 3rd edition, volume 4, pages 334–336, volume 16, page 733, 4th edition, volume 10, under the heading "emulsions"; all quotations from Ullmanns Enzyclopadie der technischen Chemie, publishers Urban und Schwarzenberg, Munich, Berlin).

The betaines used according to the invention may be added to a strongly crystallising latex prepared by a conventional method or they may be added as an emulsifier in addition to disproportionated resinic acids and optionally also fatty acids during preparation of the latex.

The polymerisation of chloroprene in aqueous alkaline emulsion with the aid of radial initiators has been known for a long time and can be carried out by a continuous or a discontinuous process.

Chloroprene can be copolymerised with up to 30% by weight of suitable monovinyl compounds (e.g. acrylonitrile, $\alpha$-chloroacrylonitrile, methacrylonitrile, methacrylic and acrylic acid esters, vinyl pyridines, styrene and vinyl toluenes) and suitable diene compounds (e.g. butadiene-(1,3), 1-chlorobutadiene-(1,3) and 2-chloro-3-methyl-butadiene-(1,3)).

The method of preparing the latices according to the invention was based on that described in British Pat. No. 1,094,321.

The alkali metal salts of disproportionated abietic acids used in the process may be, for example, their sodium or potassium salts. The disproportionated abietic acids themselves and their preparation have been described in U.S. Pat. No. 2,154,629 and No. 2,201,237. They can be obtained, for example, by the disproportionation of wood resins such as colophony. The alkali metal salts may be added in quantities of from 3 to 6 parts by weight and preferably from 3.5 to 4.5 parts by weight per 100 parts by weight of monomer.

The alkali metal salts of saturated and/or unsaturated fatty acids may be, for example, their sodium or potassium salts. The following are examples of fatty acids having from 6 to 25 C-atoms: caproic acid, caprylic acid, capric acid, lauric acid, myristic acid, palmitic acid, stearic acid arachidic acid, behenic acid, caproleic acid, lauroleic acid, oleic acid, elaidic acid, eicosenic acid, erucaic acid and linoleic acid. The fatty acid salts may be added in quantities of from 0 to 3 parts by weight, preferably from 0.5 to 1.5 parts by weight, per 100 parts by weight of monomer.

The non-ionogenic emulsifiers impart to the latices a good colloidal stability. They are preferably used in quantities of from 0.5 to 1.5 parts per 100 parts of monomer.

The following classes of compounds are given as specific examples: (a) ethylene oxide or propylene oxide adducts of substituted phenols or alcohols of the formulae (I) and (II):

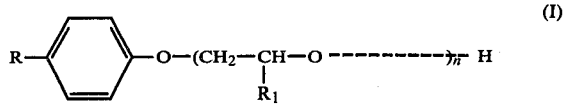

wherein R denotes a straight chained and/or branched $C_1$–$C_{20}$ alkyl group, a phenyl group and/or a phenyl group which is alkyl-substituted one or more times with substituents having from 1 to 20 C-atoms in the alkyl chain, $R_1$ denotes a hydrogen atom or a methyl group, and n represents values between 1 and 30;

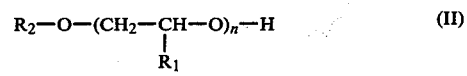

wherein $R_2$ denotes a straight chained and/or branched, saturated and/or unsaturated alkyl group having 10 to 30 C-atoms and $R_1$ and n have the meaning indicated above.

The following are individual examples:

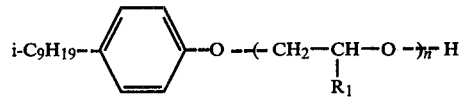

where n = 2 − 30;

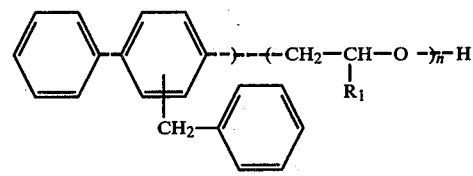

wherein n = 2 − 30;

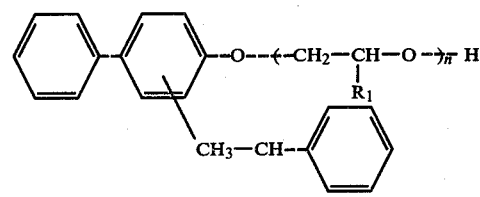

where n = 2 − 30;

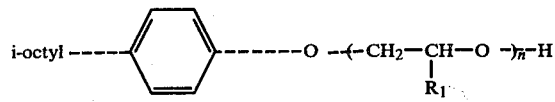

wherein n = 2 − 30;

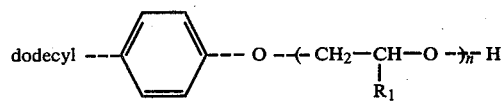

where n = 2 − 30;

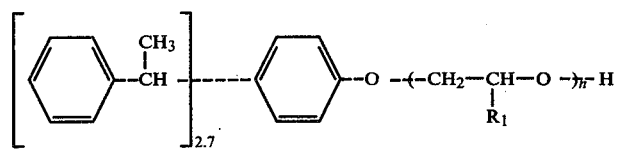

where n = 2 − 30;

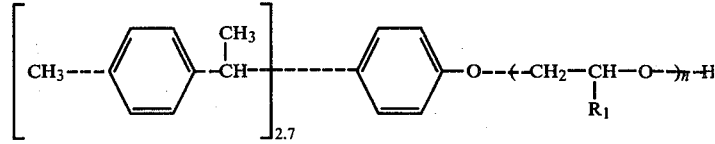

where n = 2 – 30;

Other examples are ethylene oxide or propylene oxide reaction products with cetyl alcohol, lauryl alcohol, stearyl alcohol, decyl alcohol or oleyl alcohol, wherein the number of alkylene oxide units is in each case from 2 to 30.

The polymerisation initiators used in the process are the known compounds which produce free radicals, e.g. hydrogen peroxide, water soluble salts of persulphuric acid, organic peroxides (p-menthanehydroperoxide, benzoyl peroxide, lauryl peroxide, tert.-butyl hydroperoxide) and it is particularly suitable to use formamidine sulphinic acid in accordance with German Auslegeschrift No. 1,097,689.

Polymerisation may be carried out at temperatures of from 0° to 60° C. and is preferably carried out at 5° to 30° C.

The use of the emulsifier systems described above requires preferably the emulsions to be at pH values above 10, most preferably at 10 to 12. In order to adjust the latex to high colloidal stability, it is particularly suitable to use the nonionogenic emulsifier in quantities of from 0.5 to 1.5 parts by weight (based on 100 parts of monomer).

The monomer is generally reacted until 50 to 95% of it has been polymerised. The solids content of the latex usually varies from about 30 to 50% by weight, depending on the quantity of water used (90 to 180 parts by weight per 100 parts by weight of monomer).

Unreacted organic compounds can be removed by steam distillation, for example at 50° C. and an absolute pressure of 20 Torr. The structure and properties of the polymers can be varied within wide limits by the addition of known modifying compounds such as mercaptans, xanthogen disulphides, benzyl iodide and iodoform.

The invention will now be described in more detail with the aid of examples but is not limited by them.

The monomer used as starting material in the experiments described below is a chloroprene which has been stabilized against spontaneous polymerisation with about 20 to 50 ppm of phenothiazine, or a corresponding mixture of monomers.

The solids content is determined by removing water and other volatile components from a previously weighed sample in a vacuum drying cupboard at 120° C. The weight of the dried sample is determined and the solids content is given as a percentage, based on the weight of the original sample.

Example 1

Comparison Example without the addition of betaine

A strongly crystallising polymer was prepared from a reaction mixture closely based on that described in British Pat. No. 1,094,321.

An emulsion of the following composition was polymerised under a nitrogen atmosphere:

| | | |
|---|---|---|
| chloroprene | 100.00 | parts by weight |
| n-dodecyl mercaptan | 0.15 | " |
| desalted water | 140.00 | " |
| sodium salt of disproportionated abietic acid (solids content 70% by weight) | 6.0 | " |
| caustic soda | 0.6 | " |
| sodium salt of the condensation product of naphthalene sulphonic acid and formaldehyde | 0.9 | " |
| potassium peroxidisulphate | 0.1 | " |

Polymerisation was carried out at 10° C. by continuous addition of a 2% aqueous solution of formamidine sulphonic acid to the reaction mixture.

The required conversion rate of 75% was attained after 4 hours. Residual monomer was removed by steam distillation at a pressure of 20 Torr.

The latex was condensed by addition of a 1.5% aqueous solution of sodium alginate in accordance with U.S. Pat. No. 2,405,724.

The optimum quantity of creaming agent had previously been determined by preliminary tests and found to be about 100 g of 1.5% alginate solution per 1 kg of a latex having a solids content of about 30% by weight.

After creaming, the latex had a solids content of about 56% by weight.

A 40% aqueous solution of the adduct of i-nonyl phenol and 20 mol of ethylene oxide was added to the latex with stirring so that 10 parts of the adduct of i-nonyl phenyl and 20 mol of ethylene oxide was added to 100 parts of the polymer.

EXAMPLE 2

8 parts by weight of the betaine of the following formula:

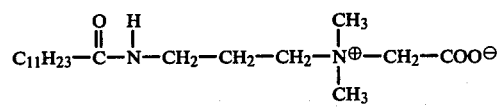

(based on 100 parts of polymer) in the form of a 30% aqueous solution which had previously been adjusted to pH 12.5 with sodium hydroxide were added with vigorous stirring to the degasified latex.

After adjustment to pH 7 with 10% acetic acid, the latex was concentrated by creaming as described in Example 1.

EXAMPLE 3

An emulsion of the following composition was polymerised as described in Example 1 under a nitrogen atmosphere at 10°–15° C.:

| | | |
|---|---|---|
| desalted water | 120.0 | parts by weight |
| sodium salt of disporportionated abietic acid (70% by weight) | 1.0 | parts by weight |
| oleic acid | 1.0 | part by weight |
| caustic soda | 0.8 | part by weight |
| a betaine of the following structure: | | |

| | | |
|---|---|---|
| $$\underset{\underset{\mathrm{CH_3}}{|}}{\overset{\overset{\mathrm{O\ \ \ \ \ \ \ \ \ H\ \ \ \ \ \ \ \ \ \ \ \ \ \ \ \ CH_3}}{\|\ \ \ \ \ \ \ \ \ \ |\ \ \ \ \ \ \ \ \ \ \ \ \ \ \ \ \ |}}{\mathrm{C_{11}H_{23}\!-\!C\!-\!N\!-\!(CH_2)_3\!-\!N^{\oplus}\!-\!CH_2\!-\!COO^{\ominus}}}}$$ | 3.0 | part by weight |
| condensaton product of naphthalene sulphonic acid and formaldehyde | 0.8 | part by weight |
| condensation product of i-nonyl phenol and 10 mol of ethylene oxide | 1.0 | part by weight |
| potassium peroxidisulphate | 0.08 | part by weight |
| chloroprene | 100.0 | part by weight |
| diethyl xanthogen disulphide | 0.40 | part by weight |

A 2% aqueous formamidine sulphinic acid solution was used as activator. It was continuously added to the reaction mixture.

Conversion of 80% of the monomer was attained after 5 hours. The reaction was stopped by removal of the monomer.

3 parts by weight of the following betaine:

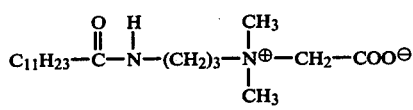

(based on 100 parts by weight of polymer) was added to the degasified latex in the form of a 30% aqueous solution at pH 12.5.

Testing of latices.

The test for coagulation was carried out using a hair sieve with a mesh of 15μ.

The latices obtained showed no sedimentation over a period of 1 month.

Stability to freezing and thawing

To determine the stability to freezing and thawing, the latex was put into a refrigerator which was kept at −30° C. After 12 hours storage at this temperature, the latex was thawed at room temperature. It was then tested for the presence of coagulate by filtration through a close meshed fabric. This test was repeated three times.

Adhesive properties

To test the adhesive properties, the latices described in the Examples were made up into an all purpose pressure sensitive adhesive, using the following formulation as guide line:

181.8 parts by weight of latex (55.0 % by weight solids content)
2.0 parts by weight of 20% Emulvin-W solution[1)]
7.5 parts by weight of ZnO Aktiv[2)] emulsified to a concentration of 33% in a 5% Vultamol solution[3)]
6.0 parts by weight of Vulkanox KSM-EM[4)] 33%
50.0 parts by weight of Dresinol 155[5)]
0-5.0 parts by weight of 10% methyl cellulose MC 50 S[6)]

[1)] Bayer Ag Leverkusen
[2)] Bayer AG, Leverkusen
[3)] BASF, Ludwigshafen,
[4)] Bayer AG, Leverkusen
[5)] 40% dispersion of a dimerised colophony ester, Hercules Powder, Wilmington USA
[6)] Wolff Walsrode AG, Walsrode-Bomlitz Contact adhesiveness The term "contact adhesiveness" means immediate bonding between two materials coated with adhesive when they are briefly pressed together for a short time. Contact adhesiveness exists only for a short time (open assembly time) after application of the adhesive. To determine this length of time, the adhesive is applied in strips 5 mm in width to a wood-free cardboard weighing 250 g/m², using a film drawing apparatus with the doctor wiper placed to form a gap of 0.2 mm. These coats of adhesive are stored in a chamber which is kept at 20° C. and 65% relative humidity. At various intervals after application of the adhesive film, two such strips are placed together cross-wise with the adhesive films in contact, in the recess provided for this purpose in the table of the testing apparatus. The table slowly moves upwards until the pressure stamp bears on the intersections of the two strips with a weight of 50 p. The contact disc of the test stamp has a diameter of 20 mm. The pressure is applied for exactly 10 seconds. At the end of this time, the table automatically descends. Contact adhesiveness is satisfactory so long as the layers of adhesive will bond together firmly.

Test for shear strength

The shear strength is tested in accordance with DIN 53273. For this test, adhesive is painted on test samples of untreated beech wood. After 30 minutes, two samples are placed toegther in such a way as to leave an overlapping surface of 2 cm², and the samples are then pressed together for 1 minute at a pressure of 30 kp/cm². Determination of the shear strength is carried out in a tension testing machine, using a spindle feed rate of 100 mm/min. This test is carried out at various times after application of the pressure.

Test for resistance to separation

The resistance to separation was tested in accordance with DIN 53274. Roughened test samples of Nora rubber (manufactured by Carl Freudenberg, Weinheim) were coated with adhesive. After 30 minutes, the adhesive surfaces were activated under infra red lamps for 4 minutes. A temperature of 70°-80° C. was reached. Two test samples were then placed together to leave an overlapping surface of 3×15 cm, and they were then pressed together for 1 minute under a pressure of 3.5 kp/cm².

The tensile test was carried out under the conditions described for the shear test.

| | Example 1 | Example 2 | Example 3 |
|---|---|---|---|
| Stability under freezing and thawing | good | good | good |
| Contact adhesiveness | 180 | 300 | 300 min. |
| Shear strength (kp/cm²) | | | |
| instant | 14.0 | 26.0 | 24.5 |
| 1 hour | 14.0 | 25.0 | 24.0 |
| 2 hours | 16.0 | 27.0 | 26.0 |
| 4 hours | 17.5 | 29.0 | 30.0 |

-continued

| | Example 1 | Example 2 | Example 3 |
|---|---|---|---|
| 6 hours | 21.0 | 34.0 | 34.0 |
| 24 hours | 30.5 | 40.5 | 46.0 |
| 9 days | 34.0 | 50.0 | 55.0 |
| Peel strength (kp/cm) | | | |
| instant | 4.2 | 5.3 | 5.6 |
| 1 hour | 4.2 | 6.0 | 5.6 |
| 2 hours | 4.2 | 6.0 | 6.6 |
| 4 hours | 4.2 | 6.0 | 6.6 |
| 6 hours | 4.2 | 6.0 | 6.6 |
| 24 hours | 4.2 | 6.0 | 6.0 |
| 9 days | 3.0 | 5.2 | 6.0 |

What we claim is:

1. In the process for producing a polychloroprene latex by radically polymerizing chloroprene optionally containing up to 30% by weight of a comonomer which is copolymerizable with chloroprene in aqueous alkaline solution containing from 90 to 180 parts by weight of water per 100 parts by weight of monomer, in the presence of an alkali metal salt of a disproportionated abietic acid and/or an alkali metal salt of a fatty acid having 6 to 25 carbon atoms and in the presence of a non-ionogenic emulsifier, the method of improving stability under conditions of freezing and thawing which comprises adding, either before, during or after polymerization, 3 to 10 parts by weight, based on 100 parts by weight of polymer, of a betaine of the formula

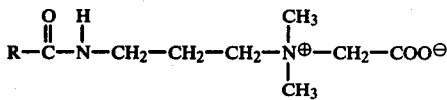

wherein R is a saturated or unsaturated, branched or straight chained alkyl group having from 7 to 18 carbon atoms.

2. The process of claim 1 wherein polymerization is carried out at a temperature of 0° to 60° C.

3. The process of claim 1 wherein polymerization is carried out at a temperature of from 5° to 30° C.

4. The process of claim 1 wherein from 5 to 95% of the monomer reactants undergo reaction.

5. A polychloroprene latex containing from 3 to 10 parts by weight, based on 100 parts by weight of polymer, of a betaine of the formula $$R-\overset{O}{\underset{\|}{C}}-\overset{H}{\underset{|}{N}}-CH_2-CH_2-CH_2-\overset{CH_3}{\underset{\underset{CH_3}{|}}{N^{\oplus}}}-CH_2-COO^{\ominus}$$

wherein R is a saturated or unsaturated, branched or straight chained alkyl group having from 7 to 18 carbon atoms.

6. An adhesive comprising a polychloroprene latex of claim 5.

* * * * *